Figure 1:
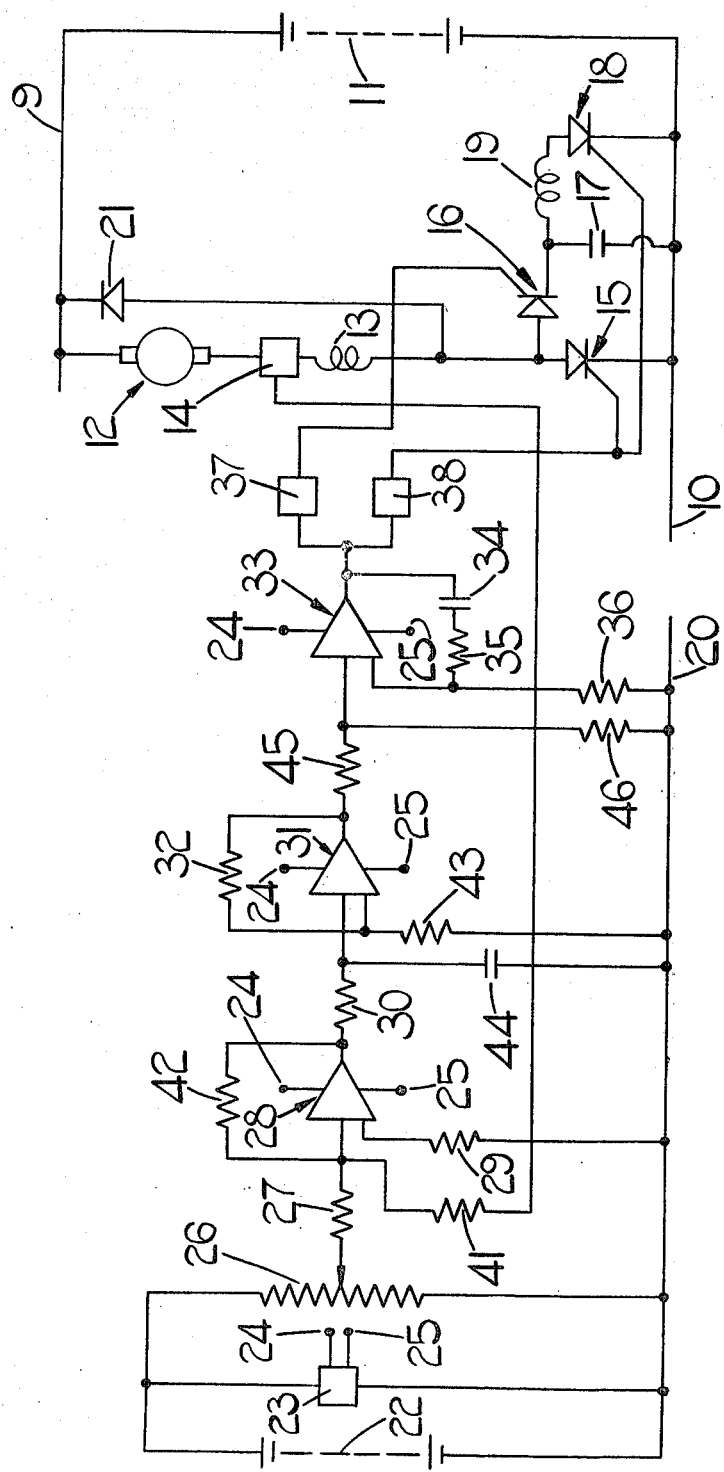

United States Patent [19]
Wright

[11] 3,984,740
[45] Oct. 5, 1976

[54] SWITCHING CIRCUITS USING OPERATIONAL AMPLIFIERS
[75] Inventor: Maurice James Wright, Birmingham, England
[73] Assignee: Joseph Lucas (Industries) Limited, Birmingham, England
[22] Filed: June 14, 1974
[21] Appl. No.: 479,554

[30]  Foreign Application Priority Data
June 30, 1973  United Kingdom............... 31312/73

[52] U.S. Cl.................................. 318/268; 318/257
[51] Int. Cl.².......................................... H02P 7/28
[58] Field of Search............................ 318/257, 268

[56]  References Cited
UNITED STATES PATENTS

| | | |
|---|---|---|
| 3,543,118 | 11/1970 | Koenig........................... 318/257 X |
| 3,564,366 | 2/1971 | Worrell.............................. 318/257 |
| 3,586,949 | 6/1971 | Spear et al......................... 318/257 |
| 3,713,009 | 1/1973 | Poppinger et al............... 318/257 X |

*Primary Examiner*—Robert K. Schaefer
*Assistant Examiner*—W. E. Duncanson, Jr.
*Attorney, Agent, or Firm*—Holman & Stern

[57]  ABSTRACT

A switching circuit has an operational amplifier connected between positive and negative supply lines and has its non-inverting input terminal connected through a resistor to an intermediate supply line. The inverting input terminal of the amplifier is fed with a signal the polarity of which varies with respect to the intermediate input terminal, and a capacitor and a resistor are connected in series between the output and non-inverting input terminal of the amplifier. The arrangement can be used in a control circuit for an electrically driven vehicle.

8 Claims, 3 Drawing Figures

SWITCHING CIRCUITS USING OPERATIONAL AMPLIFIERS

This invention relates to switching circuits using operational amplifiers.

In one aspect, the invention resides in a switching circuit comprising in combination positive and negative supply terminals, a third supply terminal at a potential intermediate the potentials of the positive and negative supply terminals, an operational amplifier connected between the positive and negative terminals and having an inverting input terminal, a non-inverting input terminal and an output terminal, a resistor connecting the non-inverting input terminal to the third terminal, a capacitor and a resistor connected in series between the output and non-inverting input terminals, and an input stage d.c. coupled to the inverting input terminal and providing thereto an input the polarity of which varies with respect to the third terminal and the maximum magnitude of which is less than the magnitude at the non-inverting input terminal when the amplifier changes state.

In one arrangement, the input stage provides a two-level input to the inverting input terminal. In this case, the input stage may include a second operational amplifier connected as a trigger circuit and having its output terminal connected to the inverting input terminal of the first-mentioned operational amplifier. Preferably, the inverting input terminal of the second amplifier is connected to the third terminal through an interference filter, and/or an attenuator.

In another arrangement, the input stage provides an analogue input to the inverting input terminal, and the capacitor is bridged by a resistor. In this case, an interference filter may be connected between the inverting input terminal of the operational amplifier and the third terminal.

The invention in another aspect resides in a control circuit for an electrically driven vehicle, comprising in combination a traction motor driving the vehicle, a thyristor chopper circuit controlling the armature current of the traction motor, said chopper circuit including a main thyristor in series with the motor, and a commutating thyristor which when fired turns off the main thyristor, and means controlling the instants of firing of the thyristor to regulate the mean current flow in the motor armature, said means including an operational amplifier having two states in which it causes firing of the main and commutating thyristors respectively, and being provided with a feedback circuit ensuring that the operational amplifier can only change state after a predetermined period of time.

Figure 2:
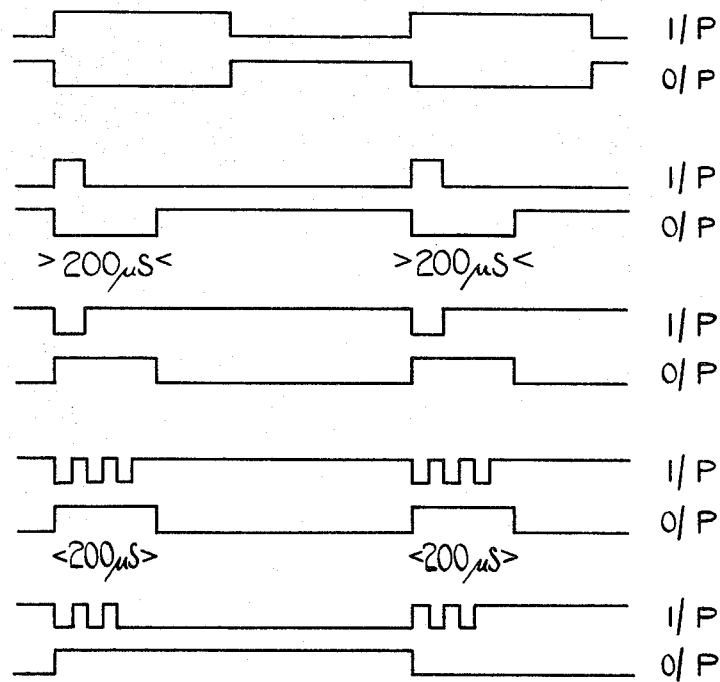
Figure 3:
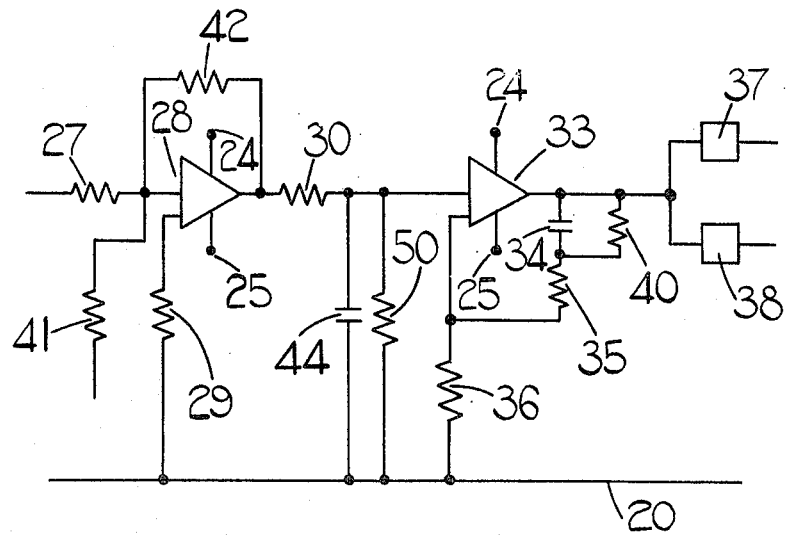

An example of the invention is illustrated in the accompanying drawings, in which FIG. 1 is a circuit diagram of a control circuit for an electrically driven vehicle, FIG. 2 illustrates a number of waveforms associated with FIG. 1, and FIG. 3 illustrates a modification of the arrangement shown in FIG. 1.

Referring to FIG. 1, the vehicle includes a traction battery 11, typically at a voltage in excess of 200 volts, and having its positive terminal connected to a supply line 9 and its negative terminal connected to a supply line 10. Connected in series between the lines 9, 10 are the armature 12 of a traction motor, a current sensing device 14, the field winding 13 of the motor and the anode-cathode path of a thyristor 15. The anode of the thyristor 15 is connected to the line 10 through the anode-cathode path of a thyristor 16 and the capacitor 17 in series, whilst the junction of the thyristor 16 and capacitor 17 is connected to the line 10 through an inductor 19 and the anode-cathode path of a thyristor 18.

The vehicle further includes a battery 22, typically at 24 volts, with its negative terminal connected to a line 20 which is earthed. Connected across the battery 22 is a power supply circuit 23 which provides low voltage power to various parts of the circuit, and in particular provides power to positive and negative terminals 24, 25, which typically are at plus and minus 15 volts respectively with respect to the line 20. Also connected across the battery 22 is a resistor 26, having movable thereon a slider which is linked to the accelerator pedal of the vehicle. The slider is connected through a resistor 27 to the inverting input terminal of an operational amplifier 28 connected between the terminals 24, 25. The current sensing device 14 provides an input by way of a resistor 41 to the inverting input terminal of the amplifier 28, the non-inverting input terminal of which is connected to the line 20 through a resistor 29, and the output and inverting input terminals of which are interconnected through a resistor 42.

The circuit further includes a second operational amplifier 31 connected between the terminals 24, 25, and having its non-inverting input terminal connected through a resistor 43 to the line 20, and its inverting input terminal connected to the output of the amplifier 28 through a resistor 30 and also connected to the line 20 through an interference filter in the form of a capacitor 44. The output terminal of the amplifier 31 is connected to its non-inverting input terminal through a resistor 32, and is also connected through a resistor 45 to the inverting input terminal of an operational amplifier 33 connected between the terminals 24, 25. The inverting and non-inverting input terminals of the amplifier 33 are connected to the line 20 through resistors 46 and 36 respectively, and the output terminal of the amplifier 33 is connected to its non-inverting input terminal through a series circuit including a capacitor 34 and a resistor 35. The output terminal of the amplifier 33 is connected to a pair of drive circuits 37 and 38, the circuit 37 being coupled to the gate of the thyristor 16 and the circuit 38 being coupled to the gates of the thyristors 15 and 18.

Considering first the operation of the chopper circuit for controlling the motor, consider a point in the cycle at which the thyristor 15 is off and the thyristor 16 is on, so that the capacitor 17 charges by way of the thyristor 16, after which the thyristor 16 turns off. At a later point in the cycle the thyristor 15 is fired so that current flows in the motor, and at the same time the thyristor 18 is fired to reverse the charge on the capacitor 17. After the capacitor charge has reversed, the thyristor 18 turns off, and at a later point in the cycle the thyristor 16 is fired again so that the capacitor 17 discharges through the thyristor 15 to turn off the thyristor 15, after which the capacitor 17 starts to charge again and the cycle is repeated.

The operational amplifier 33 has an output which is either +15 volts or −15 volts. When its output changes from negative to positive, the circuit 37 operates, and when its output changes from positive to negative, the circuit 38 operates. Assume for convenience that the armature current is less than the demanded current, and that the circuit 38 has operated so that the thyristor 15 is conducting and the armature current is increasing. The desired armature current is set by the accelerator pedal, which moves the slider over the resistor 26, and the input current to the amplifier 28 through the resistor 27 is compared with the negative input current by way of the resistor 41, and the amplifier 28 produces an output representing the difference between these two currents. Since the demanded current is greater than the actual current through the armature, the output from the amplifier 28 would be negative. This output is fed by way of the resistor 30 to the amplifier 31, which is connected in known manner to act as a trigger circuit. As the actual current increases, a point is reached at which the actual current becomes equal to the demanded current, and the output from the amplifier 28 then becomes positive. By virtue of its inherent backlash, the trigger circuit 31 does not operate immediately, but when the actual current exceeds the demanded current by a predetermined amount, the trigger circuit 31 operates to produce a negative output level. This negative level is inverted by the amplifier 33, which now produces a +15 volts output to operate the circuit 37 and turn on the thyristor 16, which extinguishes the thyristor 15 as previously explained. Thus, the accelerator pedal sets a predetermined current, and when the actual armature current reaches a first set level which is greater than the predetermined current, the thyristor 15 is turned off.

The current flow in the armature is now reducing, and a point is reached at which the demanded current becomes equal to the actual current. The positive output from the amplifier 28 now becomes zero, but once again the trigger circuit 31 does not change state immediately because of its backlash. However, as the amplifier 28 produces a negative output, then when the actual current is less than the predetermined current by a small amount, the trigger circuit 31 produces a positive output level which causes the amplifier 33 to produce a −15 volt output which operates the circuit 38 to turn the thyristor 15 on again. Thus, the thyristor 15 is turned on again at a second set level which is slightly less than the predetermined level. Variations in the predetermined level will of course result in variations in the first and second set levels, which will always be above and below the predetermined level respectively. In this way, the mean current flow in the motor armature is regulated.

In thyristor chopper circuits of the general type shown and described, it is important to ensure that the thyristor 15 is both on and off for a predetermined minimum period of time. The reason for this can easily be seen by considering the situation in which the thyristor 16 has been fired to turn off the thyristor 15, and before the turn-off procedure has been completed, the thyristor 15 is turned on again. In this case, the commutating capacitor 17 might not be charged correctly, and the thyristor 16 might not be turned off, and it will be seen that the chopper circuit will cease to operate properly. The purpose of the feedback circuit associated with the amplifier 33 is to provide the required minimum on and off periods. In order to understand how this is accomplished, assume that the input at the inverting input terminal of the amplifier 33 has just changed from +2 volts to −2 volts, their levels being determined by resistors 45 and 46 so that the potential at the output terminal of the amplifier 33 has just changed to +15 volts. Instantaneously, the potential at the non-inverting input terminal of the amplifier 33 will now be at a level set by the resistors 35 and 36, and typically this level is chosen to be +10 volts. As the capacitor 34 first discharges and then charges to the opposite polarity, the potential at the non-inverting input terminal of the amplifier 33 will fall from +10 volts to zero volts. Provided that the duration of the positive level at the inverting input terminal of the amplifier 33 is longer than the time taken for the potential at the non-inverting input terminal of the amplifier 33 to reduce to 2 volts, then when the input signal changes from +2 volts to −2 volts, the amplifier 33 will change state again. The capacitor 34 will then be charged in the opposite direction, and the potential at the non-inverting input terminal of the amplifier 33 will start at −10 volts and gradually approach zero volts again. Once the potential at the non-inverting input terminal reaches −2 volts, then a change at the inverting input terminal causes operation of the amplifier 33. This type of operation is shown in FIG. 2a, and the output follows the input, but with an inversion. The input of course varies between +2 and −2 volts whereas the output varies between +15 and −15 volts.

FIG. 2b shows what happens if the input at the inverting input terminal changes from +2 volts to −2 volts during the delay period. The change in the input is ignored for the delay period, but when the capacitor 34 has discharged to −2 volts, then the amplifier 33 switches. Similar considerations would of course apply where the input changes from −2 volts to +2 volts before the end of the delay period as indicated in FIG. 2c.

FIG. 2d shows how interference during the delay period is ignored by the circuit. The amplifier 33 changes state when the input signal goes from +2 volts to −2 volts, but the subsequent fluctuations of the input signal during the delay period are totally ignored. At the end of the delay period, the amplifier 33 changes state because the input is positive. In FIG. 2e, the amplifier 33 does not change state at the end of the delay period, because at that time the input signal is negative. The next change of state occurs when the input signal goes positive. In other words, the operation of the amplifier 33 can be summarised by stating that when the input polarity changes, the output polarity changes, and then for a predetermined period of time the circuit is totally insensitive to what happens at the input terminal. At the end of the predetermined period of time, however, the amplifier responds to whatever input signal is present at the input terminal.

It will of course be appreciated that the operation of amplifier 33 depends on the fact that during the delay period there can be no excursions at the input terminal which are greater in magnitude than the initial magnitude at the non-inverting input terminal after the amplifier 33 has switched. If, for example, the input at the input terminal could change between a magnitude greater than + and −10 volts in the example described, then the circuit would not operate in the manner required.

Although the amplifier 33 rejects interference during the delay period, the capacitor 44 assists in interference rejection, and has been found to give improved results when associated with the amplifier 31, rather than with the amplifier 33.

Turning now to the example shown in FIG. 3, the operation is similar, but the circuit has been arranged so that the trigger circuit 31 is not required. For this purpose, a resistor 40 is connected across the capacitor 34, so that whereas in FIG. 1 the potential at the non-inverting input terminal of the amplifier 33 is zero when the capacitor 34 has ceased to charge, in FIG. 2 it is at a level set by the resistor 40 in conjunction with the resistors 35 and 36. The resistors are chosen so that, in the example described, this potential is either +2 or −2 volts. The input at the inverting input terminal of the amplifier 33 will now be an analogue input which is either rising in voltage or falling in voltage with a typical maximum magnitude of 6 volts, and the amplifier 33 will change state when this voltage reaches +2 volts or −2 volts. In other words the amplifier 33 acts as its own trigger circuit and determines the upper and lower current levels. The operation with regard to the delay period is not altered in any way. However, the interference filter 44 is now connected between the inverting input terminal of the amplifier 33 and the line 20 and has a resistor 50 in parallel therewith. Also, for correct phasing, the voltage applied to resistor 27 must now be negative and that applied to 41 must be positive.

It will be understood that although the amplifier 3 and its associated component have been shown in conjunction with a control circuit for an electrically driven vehicle, the amplifier arrangement can be used in any situation where there is to be a minimum period before which the amplifier can change state.

I claim:

1. A switching circuit using an operational amplifier, comprising in combination positive and negative supply terminals, a third supply terminal at a potential intermediate the potentials of the positive and negative supply terminals, an operational amplifier connected between the positive and negative terminals and having an inverting input terminal, a non-inverting input terminal and an output terminal, a resistor connecting the non-inverting input terminal directly to the third terminal, a capacitor and a resistor connected in series as the sole feedback between the output and non-inverting input terminals, and an input stage d.c. coupled to the inverting input terminal and providing thereto an input the polarity of which varies with respect to the third terminal and the maximum magnitude of which is less than the magnitude at the noninverting input terminal when the amplifier changes state.

2. A circuit as claimed in claim 1 in which the input stage provides a two-level input to the inverting input terminal.

3. A circuit as claimed in claim 2 in which the input stage includes a second operational amplifier connected as a trigger circuit and having its output terminal connected to the inverting input terminal of the first-mentioned operational amplifier.

4. A circuit as claimed in claim 3 in which the inverting input terminal of the second amplifier is connected to the third terminal through an interference filter, and an attentuator.

5. A circuit as claimed in claim 1 in which the input stage provides an analogue input to the inverting input terminal, and the capacitor is bridged by a resistor.

6. A circuit as claimed in claim 5 in which an interference filter is connected between the inverting input terminal of the operational amplifier and the third terminal.

7. A control circuit for an electrically driven vehicle, comprising in combination a traction motor driving the vehicle, a thyristor chopper circuit controlling the armature current of the traction motor, said chopper circuit including a main thyristor in series with the motor, and a commutating thyristor which when fired turns off the main thyristor, and means controlling the instants of firing of the thyristor to regulate the mean current flow in the motor armature, said means including an operational amplifier having two states in which it causes firing of the main and commutating thyristors respectively, and being provided with a feedback circuit ensuring that the operational amplifier can only change state after a predetermined period of time.

8. A control circuit as claimed in claim 7 including positive and negative supply terminals, a third supply terminal at a potential intermediate the potentials of the positive and negative supply terminals, means for measuring the current flowing in the armature of the traction motor and providing to the inverting input terminal of the operational amplifier an input the polarity of which varies with respect to the third terminal as the current flowing in the armature varies, and a maximum magnitude of which is less than the magnitude at the non-inverting input terminal when the amplifier changes state, the non-inverting input terminal of the amplifier being connected to the third terminal through a resistor, and a capacitor and a resistor being connected in series between the output and non-inverting input terminals of the amplifier.

* * * * *